(12) United States Patent
Castleberry

(10) Patent No.: US 8,522,475 B2
(45) Date of Patent: Sep. 3, 2013

(54) TRIANGULAR SHAPED FLOWER STEM WRAP WITH OUTER PLASTIC COVERING

(76) Inventor: Wayne Castleberry, Richmond, VA (US)

( * ) Notice: Subject to any disclaimer, the term of this patent is extended or adjusted under 35 U.S.C. 154(b) by 2194 days.

(21) Appl. No.: 11/239,344

(22) Filed: Sep. 30, 2005

(65) Prior Publication Data

US 2006/0032118 A1   Feb. 16, 2006

Related U.S. Application Data

(63) Continuation-in-part of application No. 10/670,531, filed on Sep. 26, 2003.

(51) Int. Cl.
*A01G 5/00* (2006.01)

(52) U.S. Cl.
USPC .................. 47/41.01; 47/65.8; 47/72

(58) Field of Classification Search
USPC ............ 47/41.01, 59 S, 65.8; 229/87.01, 229/927
See application file for complete search history.

(56) References Cited

U.S. PATENT DOCUMENTS

| | | | |
|---|---|---|---|
| 1,044,260 A | | 11/1912 | Schloss |
| 2,247,191 A | | 6/1941 | Endres |
| 2,309,742 A | * | 1/1943 | Ballard et al. ............... 206/423 |
| 3,271,922 A | | 9/1966 | Wallerstein et al. |
| 3,657,840 A | * | 4/1972 | Benoist ..................... 47/41.01 |
| 3,767,104 A | | 10/1973 | Bachman et al. |
| 4,863,015 A | * | 9/1989 | Toltzman ................... 206/756 |
| 4,972,627 A | * | 11/1990 | Hori et al. ...................... 47/64 |
| 5,106,662 A | * | 4/1992 | Khayat .......................... 428/23 |
| 6,295,758 B1 | * | 10/2001 | Weder et al. ............... 47/41.01 |

FOREIGN PATENT DOCUMENTS

| | | |
|---|---|---|
| JP | 04352672 A | * 12/1992 |
| JP | 06046670 A | * 2/1994 |

* cited by examiner

*Primary Examiner* — Son T Nguyen
(74) *Attorney, Agent, or Firm* — John S. Hale; Gipple & Hale

(57) ABSTRACT

A horticultural cut flower container assembly having a triangular shaped piece of flexible foam material with the ends of the triangular shaped foam material being adapted to be folded over the stem ends of a bunch of cut flowers. An elastic band is placed over the folded foam material to hold foam material in a folded configuration and an outer plastic bag is placed over the folded foam material and stem ends.

18 Claims, 3 Drawing Sheets

US 8,522,475 B2

TRIANGULAR SHAPED FLOWER STEM WRAP WITH OUTER PLASTIC COVERING

CROSS-REFERENCE TO RELATED APPLICATIONS

The application is a continuation-in-part of U.S. patent application Ser. No. 10/670,531 filed on Sept. 26, 2003.

TECHNICAL FIELD OF THE INVENTION

The present invention relates generally to the use of a wrap for transporting cut flowers and plants. More particularly, this invention relates to a triangular shaped stem wrap formed of polyisocyanate foam material using diphenylmethane diisocyanates which is folded around flower stems, secured with an elastic band and sleeved within a plastic bag.

BACKGROUND OF THE INVENTION

I. Field of the Invention

The present invention relates generally to floriculture. In particular, the present invention relates to a device and method for holding the stems of cut flowers during shipment and hydrating the flowers.

II. Discussion of Background

The flower industry is a multi-billion dollar industry worldwide. In the U.S. alone, sales of cut roses exceed hundreds of million dollars per year. The most popular varieties of rose often retail for several dollars per rose. Sales of other cut flowers and plants such as bamboo are also substantial.

It is a common practice to sustain the life of cut flowers by means of inserting the end of the plant stem in a reservoir containing a liquid such as water. Flowers start to wilt just a few hours after cutting unless they are supplied with water and nutrients. The first indication of wilting is when the stem starts to bend just below the flower head. As the stem bends, the flower head droops and the flow of water up the stem is impeded. Soon afterwards, the flower petals start to discolor and the flower dies. In shipment from the grower, cut flowers are generally wrapped in newspaper or shredded paper or fiber and covered with a paper or plastic sleeve. In shipping the cut flowers are often stored under uncontrolled temperatures which can cause dehydration and destruction of lots or individual flowers.

Many techniques are available for extending the useful life of cut flowers, including changing their water regularly, adding preservatives to the water, trimming the stems, keeping the flowers away from direct sunlight, and refrigerating them. Even when such precautions are taken, cut flowers start to wilt after a few days.

A number of devices have been used for supporting and shipping cut flowers. For example, a spacing disc for a conical paper flower container having a plurality of spaced tear-shaped openings for holding flower stems as is shown by U.S. Pat. No. 3,767,104 issued Oct. 23, 1973. Flowers can be fixed to a continuous strip, which is then rolled in such a fashion that the flowers are isolated from one another to facilitate storage and transport as is shown by U.S. Pat. No. 3,657,840 issued Apr. 25, 1972. Holders for cut flowers include a flexible paper cover for protecting the flower petals as shown by U.S. Pat. No. 3,271,922 issued Sept. 13, 1966 and a cardboard sleeve for receiving the stems as shown by U.S. Pat. No. 2,247,191 issued Jun. 24, 1941. A waterproof wrapper for corsage stems is shown by U.S. Pat. No. 1,044,260 issued Nov. 12, 1912.

There is a need for a simple, easy-to-use container for cut flowers which keep the flowers hydrated during wholesale shipment and/or delivery from the florist to the end user. The container should not damage the stems of the flower when wrapped and should hold the stems firmly, allowing air water and nutrients to contact each stem and be simple and inexpensive to manufacture.

SUMMARY OF THE INVENTION

A triangular shaped foam material is wrapped over the cut ends of the stems of cut flowers with the sides folded over to form a wrap covering the stems. The wrap is held in place with an elastic band over the ends of the stems. The wrap is constructed of a sterile diphenylmethane diisocyanate (MDI) foam material having at least 50% of its pores ranging in size from 10 to 200 microns. The wrap is dipped into water and is then placed in a plastic bag.

The present invention provides a novel cut plant container for providing liquid to a cut flower wherein a substantial amount of the liquid required by the plant is presented to the cut end of the plant stem for preserving the life of a cut flower.

It is an object of the invention to provide a horticultural container for cut flowers having a homogeneous horticultural foam material which is sterile.

It is another object of the invention to provide a horticultural container for cut flowers which hydrates flowers in shipment.

It is yet another object of the invention to provide a horticultural container for cut flowers which directs water held in the foam to the stems.

It is still another object of the invention to provide a horticultural container for cut flowers which can be economically fabricated to fit a wide variety of stem bunch sizes.

It is another object of the invention to provide a horticultural container for cut flowers which can be easily applied by the shipper or florist to bunches of cut flowers.

These and other objects, advantages, and novel features of the present invention will become apparent when considered with the teachings contained in the detailed disclosure along with the accompanying drawings.

DETAILED DESCRIPTION OF THE INVENTION

Figure 1:
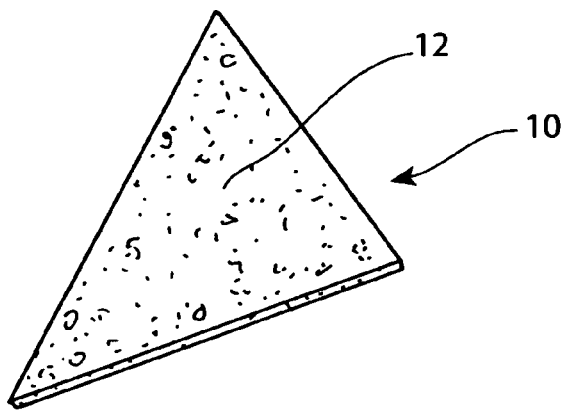
FIG. 1 is a perspective view of triangular shaped foam member of the present invention.

The preferred embodiment and best mode of the invention is shown in FIGS. 1 through 7.

The invention is directed toward a triangular shaped foam member 10 formed of an aromatic polyisocyanate polymer diphenylmethane diisocyanate (MDI) flexible foam material using no filler material which hydrates cut flowers in shipment by directing water absorbed in the foam wrap to the stems.

The polyisocyanate used in the foam material is an aromatic polyisocyanate which includes aromatic diisocyanates having 6 to 16 carbon atoms (excluding those contained in NCO groups; this applies to the polyisocyanates mentioned below), aromatic triisocyanates having 6 to 20 carbon atoms and crude products of these isocyanates, etc. Examples of aromatic polyisocyanate include 1,3- and 1,4-phenylene diisocyanates, 2,4- and/or 2,6-tolylene diisocyanates (TDI), crude TDI and 2,4'- and/or 4,4'-diphenylmethane diisocyanate (MDI) as well as crude MDI.

The preferred material which is used as the foam material in the invention is one or more of 2,2'-, 2,4'- and 4,4'-diphenylmethane diisocyanate (MDI), crude MDI, products of crude diaminodiphenyl methane where the crude diaminodiphenyl methane is a polymeric MDI or a mixture of the same; or is a mixture of diaminodiphenyl methane and a small amount (e.g., 5 to 20 mass %) of a polyamine having three or more functional groups; polyallyl polyisocyanate (PAPI), etc.

Such material is readily obtained in the market place and examples of same for purposes of showing commercial availability but which should not be construed as limiting are: BASF M-20S, and Rubinate 1680, Rubinate 1790, Rubinate 7302, Rubinate 7400, Rubinate 8700, Rubinate 9410 and Suprasec DNR all of which are available from ICI Americas.

The material is foamed in a conventional manner with a blowing agent such as carboxylic acids and anhydrides. It is important that no filler material is added to the foamed material and the material is substantially sterile with a neutral pH ranging from 6.8 to 7.8. The term substantially sterile is used in a horticultural sense and not as a medical term meaning the material is free from plant disease, microbes, fungus, insects, disease, algae and animal life.

The material has a pore size with total porosity ranging from 85% to 95%, preferably from 90% to 92% with an air space ranging from 25 to 35%, preferably about 30%. Air space is the percent volume of a component which is filled with air after the material is saturated and allowed to drain. For a given density and moisture content, Total Porosity+ Container Capacity+Air Space. The present invention has a density of 1.00 to 3.00 preferably about 1.35 pounds per cubic foot and tensile strength ranging from 7.5 to 9.5, preferably at 8.0 psi per minute. The tear strength ranges from 0.18 to 0.22, preferably 0.2. Total porosity is the percent by volume of the foam that is comprised of pores. This is the volume fraction which provides the water and aeration in the foam material. The total porosity+the percent solids=100%. At least 40% to 60%, preferably about 50% of the foam material volume and the material contains pores ranging in size between 10 and 200 microns, preferably from about 40 to about 90 microns. These pores sizes are defined as mesopores which are responsible for water retention.

The micropore fraction (0.2 to 10 microns) of the foam material may range from 15% to 25% by foam volume, and preferably is held constant at about 20%. Micropores are responsible for water reserve and consist of open and closed pore cubic inch of foam.

The macropore fraction of the foam material ranges from 25% to 35%, preferably about 30% of the foam volume and contains pores ranging in size between 300-800 microns. These macropores are responsible for drainage and aeration.

The triangle shape is preferably that of an isosceles triangle with equal sides ranging from 9 inches to 12 inches. Preferably, the triangle has equal sides of 10 inches in length and a hypotenuse of 14 inches. The thickness of the foam material ranges from ¼ inch to 1½ inch with the preferred thickness being ¼ inch.

Figure 2:
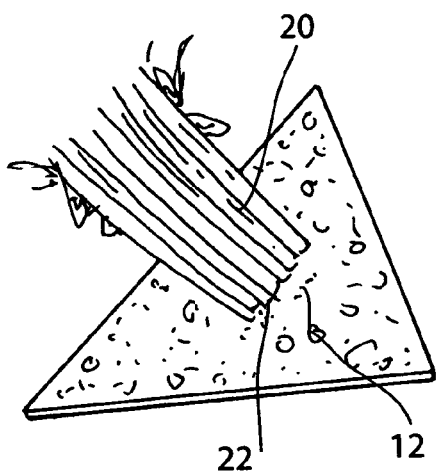
FIG. 2 is a perspective view of the foam wrap of FIG. 1 with a broken away portion of the flower stems being placed in the middle of the foam member.
Figure 3:
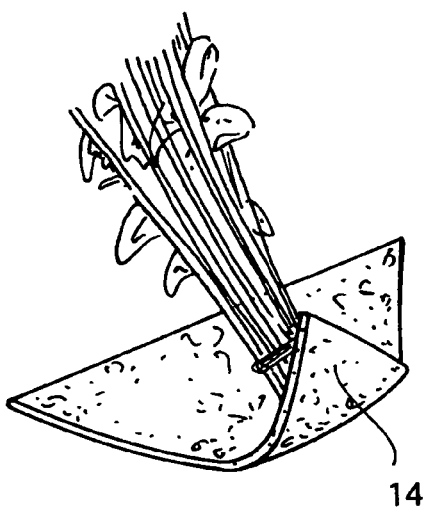
FIG. 3 is a sequential perspective view of the foam member of FIG. 2 showing a first corner portion of the triangular wrap being folded over the ends of the flower stems.
Figure 4:
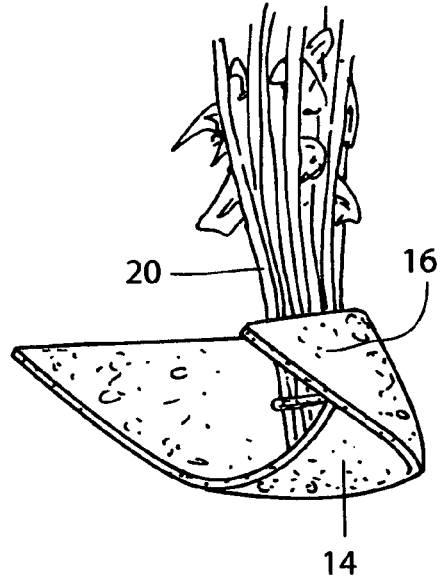
FIG. 4 is a sequential perspective view of FIG. 3 showing a second corner portion of the triangular wrap being folded over the end portion.
Figure 5:
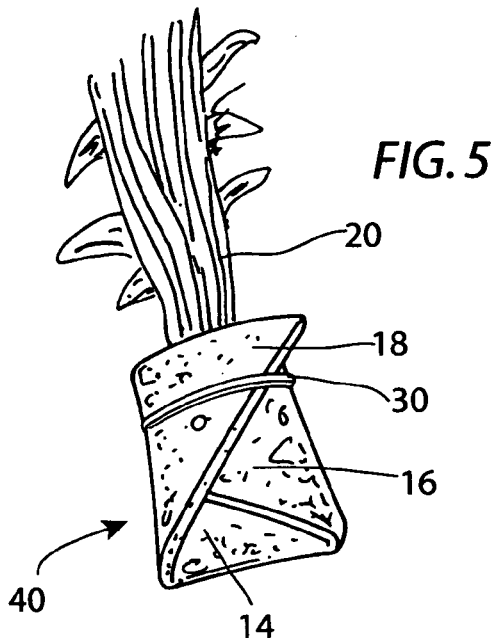
FIG. 5 is a sequential perspective view of a FIG. 4 showing the third corner portion of the triangular wrap folded over the second corner portion and the wrap held in place with an elastic band.

As is shown in FIG. 2, the flower stems 20 of a bunch of flowers are placed in the middle 12 of the triangular foam structure member 10. A corner portion 14 of the triangular member 10 is folded over the cut ends 22 of the flower stems 20. A second corner portion 16 of the triangular member 10 is folded over the first corner portion 14 and the other corner portion 18 of the triangular member 10 is folded over the second corner portion 16 and the completed wrap held together with an elastic band 30 such as a rubber band forming a finished wrap 40. The wrap is then soaked with water and such preservatives and nutrients as required.

Figure 6:
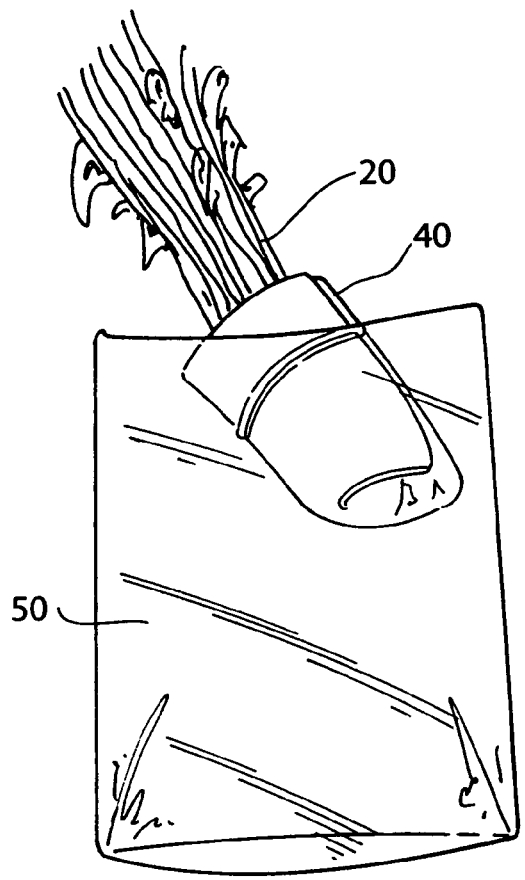
FIG. 6 is a sequential perspective view of FIG. 5 showing the wrap and stems being inserted into a plastic bag.
Figure 7:
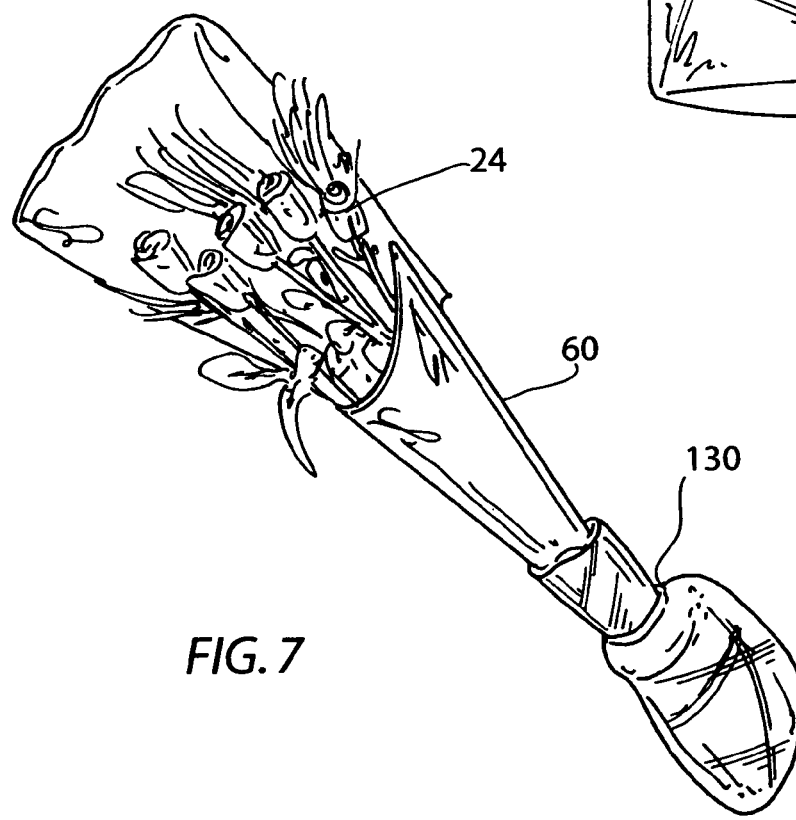
FIG. 7 is a final package of the flower stems and wrap with the plastic bag being sealed over a sleeve covering the flower blooms.

As shown in FIG. 6 the wrap 40 and stems 20 are inserted into a plastic polyethylene bag 50. FIG. 7 shows the final package of the flower stems and wrap 40 with the plastic bag 50 being sealed by an elastic band 130 such as a rubber band over a sleeve 60 covering the flower blooms 24 of the cut flowers.

Figure 8:
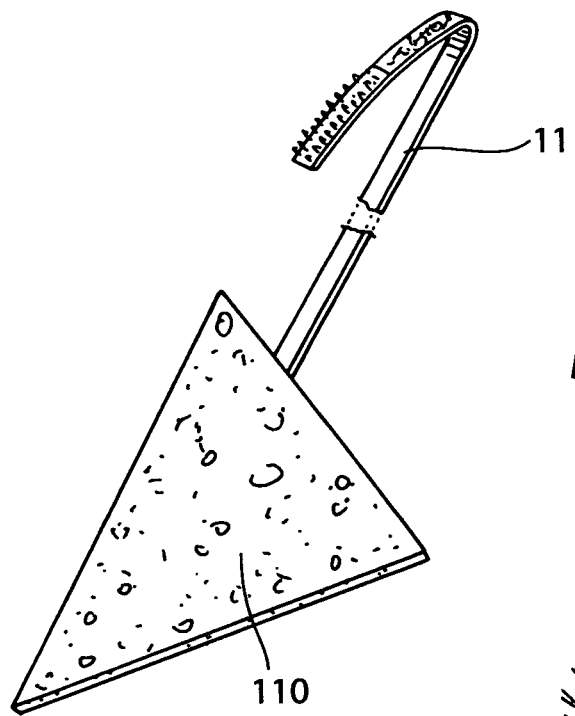
FIG. 8 is a perspective view of another embodiment of the triangular shaped foam member with an integral VELCRO® covered strap.
Figure 9:
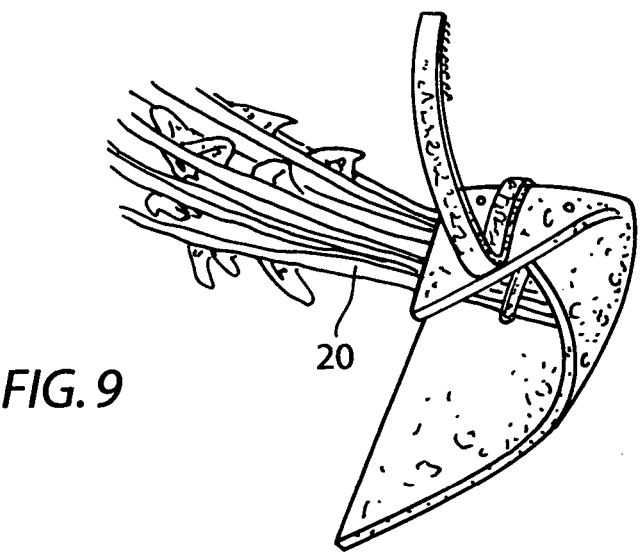
FIG. 9 is sequential perspective view of the foam member of FIG. 8 being folded over the ends of flower stems.
Figure 10:
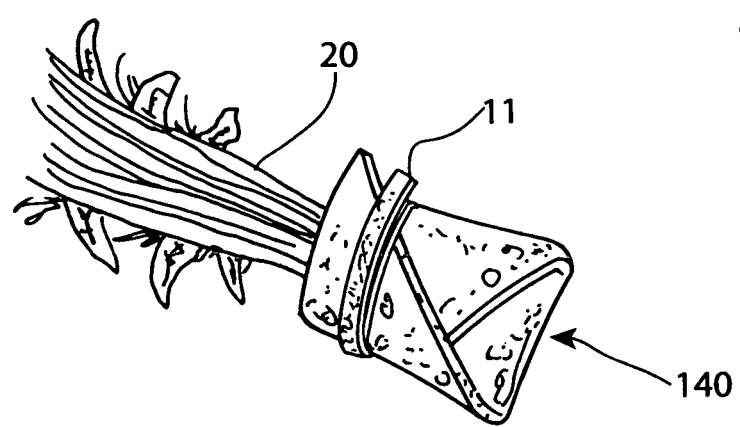
FIG. 10 is a perspective view of the flower stems wrapped in the foam member of FIG. 8.

FIG. 8 discloses another embodiment of the triangular shaped foam member 110 with an integral strap 11 having a VELCRO® type fastener. If desired, the strip can have adhesive material deposited thereon allowing the ends to be fastened to each other. FIGS. 9 and 10 show the same folding of the foam member corners as previously described to form wrap 140.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. A horticultural cut flower container assembly comprising:
 a triangular shaped member of flexible diphenylmethane diisocyanate foam material, the ends of the triangular shaped foam material being adapted to be folded over the stem ends of a bunch of piece of cut flowers and a band encircling said folded foam material to hold said foam material in a wrapped configuration and an outer plastic bag placed over said folded foam material.

2. A horticultural cut flower container assembly as claimed in claim 1 wherein said diphenylmethane diisocyanate foam material is taken from a group consisting of polymeric diphenylmethane diisocyanate, crude diphenylmethane diisocyanate, 4,4'-, 2,4'-, 2,2'-diphenylmethane diisocyanate.

3. A horticultural cut flower container assembly as claimed in claim 1 wherein said diphenylmethane diisocyanate foam material is one or a mixture of 2,2'-, 2,4'- and 4,4'-diphenylmethane diisocyanate (MDI), polymeric MDI, crude MDT, namely, products of crude diaminodiphenyl methane or a mixture of the same.

4. A horticultural cut flower container assembly as claimed in claim 1 wherein said foam material has at least 50% of its pores by foam volume ranging in size between 10 and 200 microns.

5. A horticultural cut flower container assembly as claimed in claim 1 wherein said foam material has a porosity ranging from about 85% to about 95% by foam volume with the pores ranging in size from 40 to about 90 microns.

6. A horticultural cut flower container assembly as claimed in claim 1 wherein said triangular foam member has an integral fastening strap secured thereto.

7. A horticultural cut flower container assembly as claimed in claim 6 wherein said fastening strap has VELCRO® fastening means.

8. A horticultural cut flower container assembly as claimed in claim 6 wherein said fastening strap has ends with an adhesive material secured thereto.

9. A horticultural cut flower container assembly as claimed in claim 1 wherein said outer plastic bag is polyethylene.

10. A horticultural cut flower container assembly as claimed in claim 1 wherein said triangularly shaped wrap is in the form of a right isosceles triangle.

11. A horticultural cut flower container assembly as claimed in claim 1 wherein said triangular shaped wrap is a right isosceles triangle having sides ranging from 9 inches to 12 inches in length and a thickness ranging from ⅛ inch to ½ inch.

12. A horticultural cut flower container assembly as claimed in claim 11 wherein said sides are about 10 inches in length with an hypotenuse of about 14 inches.

13. A horticultural cut flower container assembly as claimed in claim 11 wherein said triangular shaped wrap has a thickness of about ⅛ inch.

14. A horticultural cut flower container, assembly comprising:
an isosceles triangle shaped member of flexible foldable unfilled diphenylmethane diisocyanate foam material having a thickness ranging from ⅛ inch to ½ inch with the length of the equal sides of the isosceles triangle ranging from 9 inches to 12 inches, the ends of the triangle shaped foam material being adapted to be folded over the stem ends of a bunch of piece of cut flowers and an elastic band encircling said folded foam material to hold said foam material in a wrapped configuration and an outer plastic bag placed over said folded foam material.

15. A horticultural cut flower container assembly as claimed in claim 14 wherein said foam material elastic band is replaced with an integral fastening strap secured thereto.

16. A horticultural cut flower container assembly as claimed in claim 15 wherein said fastening strap has ends with an adhesive material secured thereto.

17. A horticultural cut flower container assembly as claimed in claim 14 wherein said diphenylmethane diisocyanate foam material is taken from a group consisting of polymeric diphenylmethane diisocyanate, crude diphenylmethane diisocyanate, 4,4'-, 2,4'-, 2,2'-diphenylmethane diisocyanate.

18. A horticultural cut flower container assembly as claimed in claim 14 wherein said diphenylmethane diisocyanate foam material is one or a mixture of 2,2'-, 2,4'- and 4,4'-diphenylmethane diisocyanate (MDI), polymeric MDI, crude MDI, namely, products of crude diaminodiphenyl methane or a mixture of the same.

* * * * *